United States Patent Office 2,987,916
Patented June 13, 1961

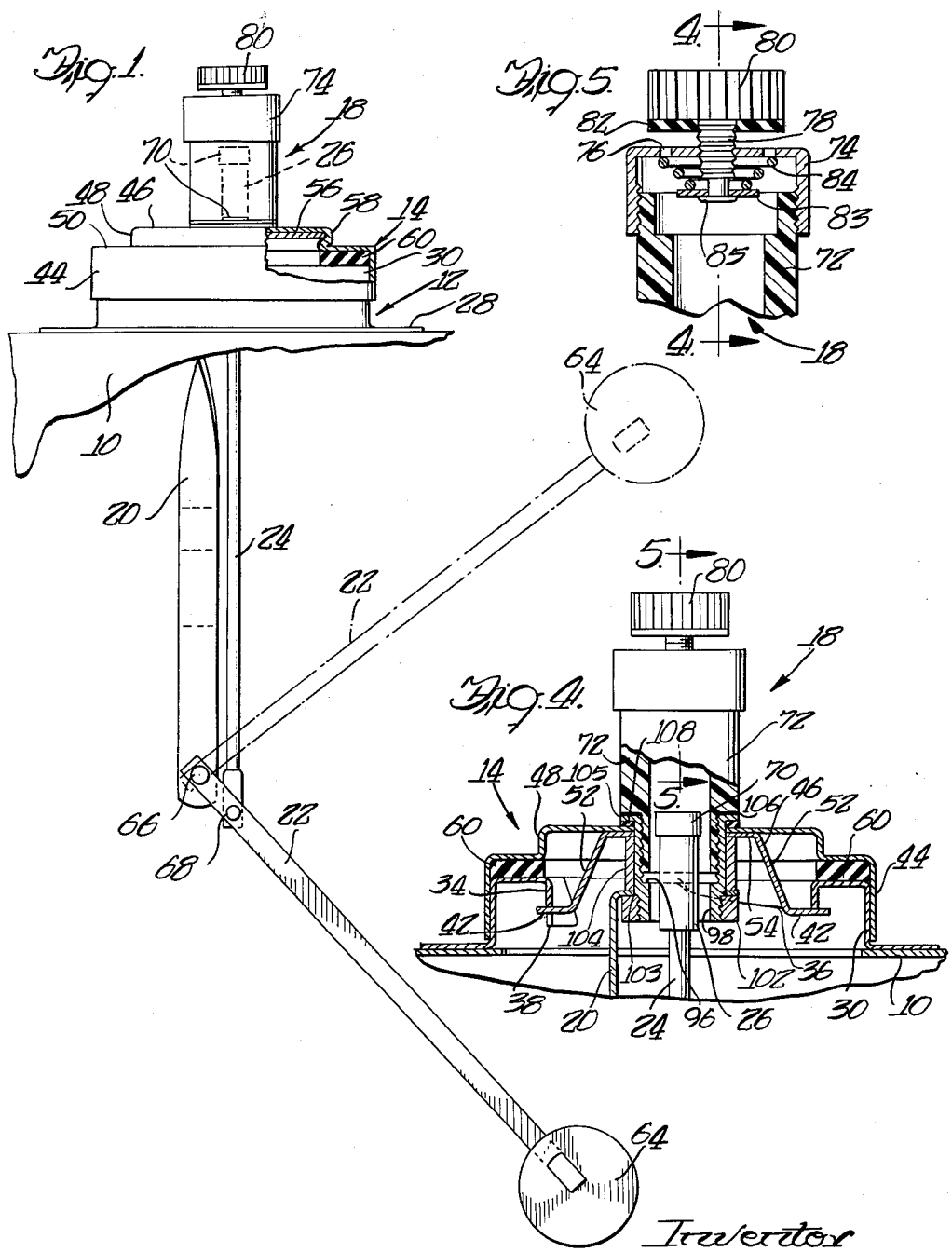

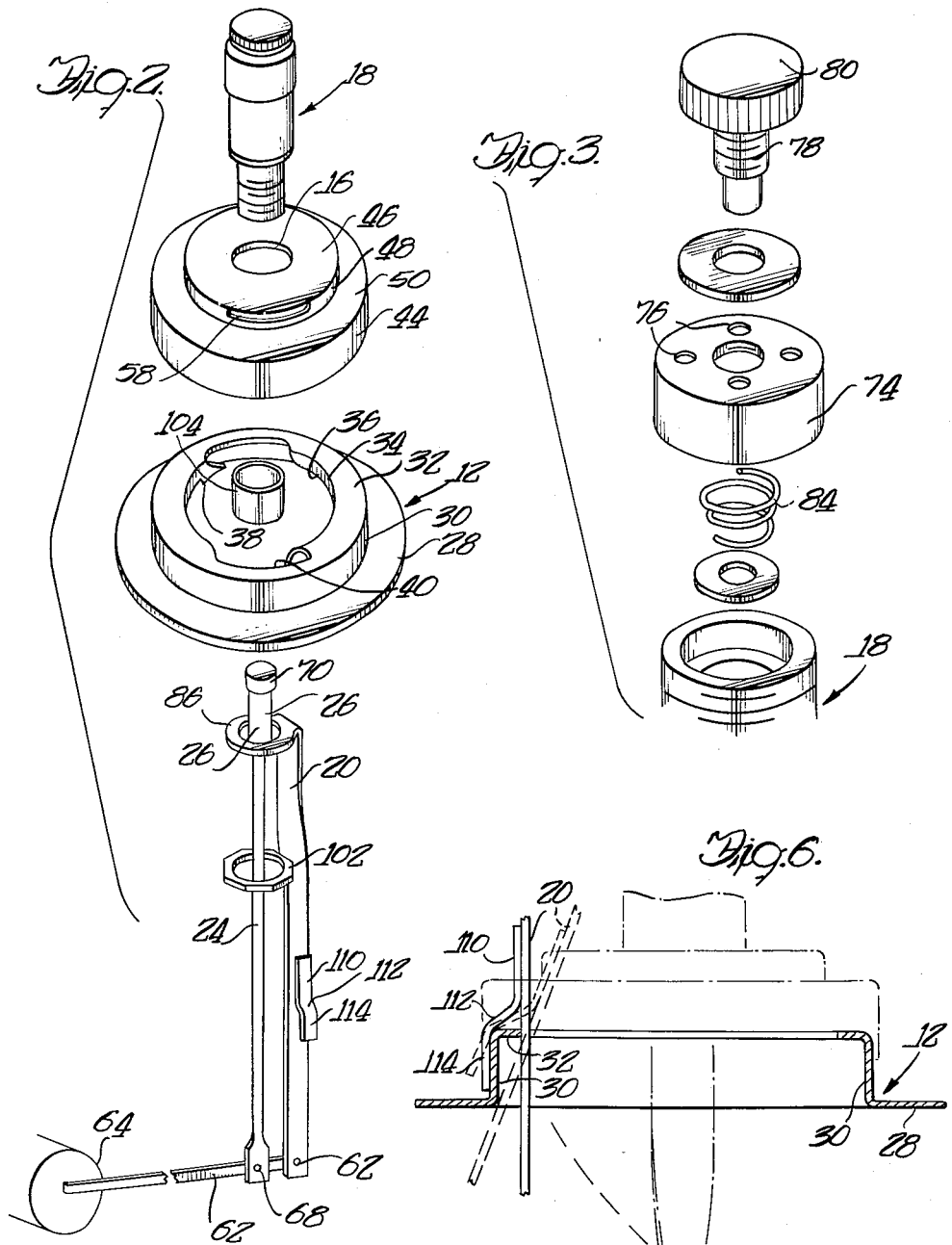

2,987,916
LIQUID LEVEL GAUGE
Joseph F. Wilhelm, 1056 W. Mason St., Green Bay, Wis.
Filed July 30, 1957, Ser. No. 675,185
3 Claims. (Cl. 73—317)

My invention relates to gauges and includes among its objects and advantages a gauge for use in connection with containers of the type employed to carry liquid fuel for internal combustion engines, of cheap and rugged construction and an exceptionally wide adaptability.

The relatively complicated indicators provided in new motor cars occasionally get out of order, and when they do, repair or replacement is quite expensive. The users of outboard motors for small boats also carry fuel around in liquid fuel containers of a wide variety of shapes and sizes, many of which containers have either no gauge at all, or one that is more or less inaccurate or inconvenient to use. The single unit of the invention is intended to be adaptable for almost any portable container of the type used in connection with outboard motors and for many of the tanks on motor cars. Some particular advantages that are almost requirements for such service are that the gauge may be read at a glance, without any manipulation to be able to see it, or to cause it to give its indication; and simple and effective means for avoiding a vacuum when fuel is being added or withdrawn, and for sealing the entire assembly hermetically against leakage at other times, even under quite rough handling.

In the accompanying drawings:

FIGURE 1 is a side elevation of a complete unit indicated as installed in the position of use;

FIGURE 2 is an exploded view of the gauge proper and the associated cap and tank fitting;

FIGURE 3 is an exploded view of the air vent at the top of the gauge.

FIGURE 4 is a section as on line 4—4 of FIGURE 5;

FIGURE 5 is a section on line 5—5 of FIGURE 4; and

FIGURE 6 is a fragmentary diagram indicating the usual position for the parts when the container is being filled.

In the embodiment selected to illustrate the invention, a conventional container 10 is provided with a conventional fitting 12 for the fill opening. The closure cap 14 is conventional except for the central axial aperture 16 to receive and support the gauge proper.

The gauge comprises the sight chamber 18, the depending standard 20, the float arm 22, the pitman 24, the indicator element 26, and means for fastening the parts in place in the aperture 16 with a swivel adjustment about the vertical axis of the device between the standard 20 and the sight chamber 18.

The fitting 12 comprises a base flange 28 affixed to the tank 10, the ring 30, and an inwardly extending top flange 32. The inner edge of the top flange 32 is turned down to define segmental flanges 34 having helically inclined lower edges 36 with stop hooks 38 at the lower ends of the inclined edges. Between the flange portions 34, the top flange 32 is notched radially outward at 40 to permit the toes 42 carried by the cap 14 to pass down and get under the edges 36. On reference to FIGURE 2, it will be apparent that the toes 42 may pass down through the notches 40, and subsequent clockwise rotation of the cap will start the toes 42 along under the inclined edges 36 until further rotation is interrupted by engagement with the hooks 38.

The cap 14 comprises the skirt 44, which is a freely sliding fit on the neck 30, and a top member defining the central aperture 16 surrounded by a central plateau 46 integral with a cylindrical offset 48, which is integral with an outer shelf 50 integrally joined to the upper edge of the skirt 44. The toes 42 are at the end of spring arms 52 (see Figure 4) which extend downwardly and outwardly from the plane annulus 54. The annulus 54 is integrally united with the cap 14. This could be done by welding along the edges of the aperture 16, but I have illustrated radial extension means 56 (see Figure 1) having its outer edge locked into a groove at 58 formed in the cylindrical wall 48. Between the shelf 50 and the top flange 32, I provide a conventional sealing gasket 60 adhesively affixed to the lower surface of the shelf 50 and compressed to form a tight seal by turning the cap clockwise to push the toes 42 down.

The movable sub-assemblies in the gauge are only two. The float arm 22 carries a cylindrical float 64 at its outer end and is pivoted to the lower end of the standard 20 at 66. The pitman 24 is pivoted to the float arm 22 at 68. At the upper end of the pitman is the enlargement 26. It is convenient to make this indicator element 26 a separate member and to color it red and to provide it with a short enlarged top portion 70. This short enlargement secures much better visibility when someone 5', or 10', or 15' away from the gauge tries to read it with the naked eye. The indicator element 26—70, during normal use, lies in the sight chamber 18 guided by an encircling transparent tube 72 of plastic.

When the device is in use and liquid is being withdrawn from the tank, it is usually necessary to provide air inlet means to avoid developing a vacuum in the tank. I have indicated a metallic cap 74 closing the upper end of the tube 72, and provided with air inlets 76. Operator-controlled means are provided for opening the vents 76, or for closing them when the tank is functioning for transportation rather than supply. The threaded stem 78 carries a knurled head 80 and a sealing gasket 82 adapted to cover the vents 76. When the head 80 is screwed down to compress the gasket 82 over the vents, the parts will remain in adjusted position. When the parts are adjusted to open the vents, as indicated in FIGURE 5 accidental displacement to closed position is avoided by a helico-spiral spring 84, which secures a frictional contact and keeps an axial load on the screw 78.

Because the containers 10 may be of a wide variety of shapes and sizes, adjustment of the orientation of the plane of movement of the float arm 22 with respect to the plane of the notches 40 is necessary to get the float 64 where it will not strike the sides of the container and be prevented from functioning. As best illustrated in FIGURES 2 and 4, the standard 20 carries a horizontal ring 86 at its upper end. The tube 72 has a downwardly facing shoulder and a threaded portion extending below the shoulder. The threaded portion 90 is threaded into a metallic nipple 103 having a top flange 105, an upwardly facing shoulder 96 about midway of its length, and a lower end tube 98 of the same inside diameter as the tube 72. The lower end portion 98 is externally threaded to receive the lock nut 102. To get this lock nut down far enough for convenient access by the user, the parts are proportioned, as indicated in FIGURE 4, and a thrust sleeve 104 lies below the annulus 54 and above the lock nut 102. Above the nipple flange 105, I provide a packing ring 106, and below it, I provide a packing ring 108.

It will be apparent that the tightening of the lock nut will clamp the nipple and the cap 14 and the standard 20 against all relative movement. With respect to each other, a slight loosening of the nut 102 will permit the standard 20 to be turned with respect to the cap to a position such that the float arm 22 will swing clear of the side walls of the container when the toes 42 are in contact with the hooks 38. This simple adjustment is made once only, when the gauge is installed, and remains undisturbed throughout the life of the equipment.

With such a gauge installed, it is necessary to lift the gauge partly out of the container to be able to insert a filling nozzle. To prevent a person removing the gauge for filling purposes only from taking the equipment completely away from the container where it may become soiled or lost, I make float 64 too large to be removed through the fitting 12 unless the axis of the float is substantially along the axis of the fitting. Then I assemble the float, as indicated in FIGURE 2, with its axis at right angles to the arm 22, so that a user grasping the cap 14 and lifting up will always bring the float 64 up to the fitting with its axis in the wrong direction, so that removal is prevented. If the user desires to remove the gauge completely, that can easily be done by swinging the entire unit over on its side, so that the float 64 is turned into a vertical position and may easily pass out through the fitting.

Means are provided for the convenient support of the gauge and cap during the operation. The downwardly opening hanger comprises a base plate 110 affixed to the standard 20, an offset 112, and a downwardly extending end portion 114. These are so located that lifting the cap 14, after rotating it so that the toes 42 pass through the notches 40, brings the hanger into register with one of the notches 40, so that the user can hang the entire gauge and cap on the notched portion of the top flange 32, as indicated in FIGURE 6. The center of gravity of all the movable parts is materially above the point of support thus provided. If the user puts the gauge in the full line position of FIGURE 6 and lets go, the parts may tilt to the dotted line position, but a filling nozzle can still be inserted easily, and may or may not push the parts back to the full line position.

Referring now more particularly to FIGURES 2 and 4, it is pointed out that the parts are so proportioned that after the nut 102 is telescoped over the pitman 24, and the pivotal connections made at 62 and 68, the float arm cannot move to any position that will lower the pitman far enough to let the indicator top 70 get out of the annulus 86. Therefore, this sub-assembly shown at the bottom of FIGURE 2 can lie around on the assembly bench, and it is impossible for the nut 102 to get lost.

When the tube 72 is removed from the nipple, the upwardly facing shoulder at the top of the nipple 104 is at such a level that the lower end of the indicator member 26 may hook over it. The abutment holds the pitman 24 up high enough to keep the float arm 22 in the dotted line position of FIGURE 1, or a little higher, which is convenient in handling the cap 14 with the standard and float arm already assembled, but the tube 72 not yet put in place. Another advantage of the nipple connection disclosed is that after adjustment of the parts to the right orientation for the container and tightening of the nut 102, a person unscrewing the tube 72, either as a practical joke, or in an ignorant attempt to take the gauge to pieces, as a matter of curiosity, does not disturb the adjustment made before the nut 102 was tightened.

Others may readily adapt the invention for use under various conditions of service by employing one or more of the novel features disclosed or equivalents thereof. As at present advised, with respect to the apparent scope of my invention, I desire to claim the following subject matter.

I claim:
1. A liquid gauge comprising in combination, a container having an opening with a conventional female bayonet fitting; and a closure cap for said fitting, said closure cap having a central aperture, a tube having an outwardly extending flange about the upper end thereof and having its lower end externally threaded, said tube extending downward through the aperture in said cap with the underside of said flange engaging the area of said cap immediately adjacent said aperture for support, a male bayonet fitting complementing said female fitting and comprising an inverted U-shaped structure having a pair of outwardly directed toes at the lower ends of its legs respectively and having an opening in the bight thereof; the opening in the bight of said male bayonet fitting receiving a lower portion of said tube under said cap, a thrust sleeve receiving a lower portion of the tube under said male bayonet fitting, an inverted L-shaped depending standard having an opening in the horizontal leg thereof which opening receives the lower portion of said tube under said thrust sleeve, a take-up nut threadedly engaging the lower end of said tube and abutting the underside of the horizontal leg of said standard, and holding all parts received on said tube under compression in fixed relation, a first horizontal pintle near the lower end of said standard, a float arm pivoted on said first pintle, a float on the end of said float arm, a transparent sight tube having its lower end open and peripherally hermetically sealed in the upper end of said tube, said sight tube having a closed upper end, a second pintle on said float arm, said second pintle being spaced from said first pintle toward said float a minor fraction of the length of said float arm, and an upwardly extending pitman having its lower end pivoted on said second pintle and its free upper end loosely received in said sight tube and constituting a visual indication means for the amount of liquid in said container.

2. A liquid gauge as described in claim 1 wherein a vent valve is disposed in the upper end of said sight tube.

3. A liquid gauge as described in claim 2 wherein a hook is secured on said standard and is shaped to hook over the edge of said container opening fitting.

References Cited in the file of this patent
UNITED STATES PATENTS

| | | |
|---|---|---|
| 952,356 | Preston | Mar. 15, 1910 |
| 2,236,063 | Losee | Mar. 25, 1941 |
| 2,430,290 | Hann | Nov. 4, 1947 |
| 2,446,844 | Molaver | Aug. 10, 1948 |
| 2,468,284 | Balken | Apr. 26, 1949 |
| 2,718,784 | Brake | Sept. 27, 1955 |

FOREIGN PATENTS

| | | |
|---|---|---|
| 7,984 | Great Britain | 1909 |
| 10,098 | Great Britain | 1896 |
| 651,949 | Great Britain | Oct. 16, 1928 |
| 684,076 | Great Britain | Dec. 10, 1952 |

UNITED STATES PATENT OFFICE
CERTIFICATE OF CORRECTION

Patent No. 2,987,916 June 13, 1961

Joseph F. Wilhelm

It is hereby certified that error appears in the above numbered patent requiring correction and that the said Letters Patent should read as corrected below.

Column 2, line 22, after "or", second occurrence, insert -- even --; line 39, after "FIGURE 5" insert a comma; column 3, line 48, for "The" read -- This --; column 4, line 44, for the claim reference numeral "2" read -- 1 --.

Signed and sealed this 31st day of October 1961.

(SEAL)
Attest:

ERNEST W. SWIDER
Attesting Officer

DAVID L. LADD
Commissioner of Patents

USCOMM-DC